United States Patent
Han et al.

(10) Patent No.: US 8,576,776 B2
(45) Date of Patent: Nov. 5, 2013

(54) APPARATUS AND METHOD FOR OVERHEAD REDUCTION OF FEEDBACK IN CLOSED LOOP MIMO SYSTEM

(75) Inventors: Shuangfeng Han, Suwon-si (KR); Zhen Wang, Suwon-si (KR); Ho-Kyu Choi, Seongnam-si (KR); Cheng Shan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 12/806,150

(22) Filed: Aug. 6, 2010

(65) Prior Publication Data
US 2011/0032872 A1    Feb. 10, 2011

(30) Foreign Application Priority Data
Aug. 6, 2009   (KR) .................. 10-2009-0072503

(51) Int. Cl.
*H04W 4/00*    (2009.01)

(52) U.S. Cl.
USPC .......................... 370/328; 455/422.1

(58) Field of Classification Search
None
See application file for complete search history.

(56) References Cited

U.S. PATENT DOCUMENTS

| | | | |
|---|---|---|---|
| 2003/0220103 A1* | 11/2003 | Kim et al. .................. | 455/422.1 |
| 2004/0266484 A1* | 12/2004 | Kogiantis et al. .......... | 455/562.1 |
| 2010/0172432 A1* | 7/2010 | Li et al. ..................... | 375/295 |

* cited by examiner

*Primary Examiner* — Yemane Mesfin
*Assistant Examiner* — Khoa Huynh

(57) ABSTRACT

A method and apparatus reduce overhead of feedback in a closed loop Multiple Input Multiple Output (MIMO) system. A controller feeds back the long-term Precoder Matrix Index (PMI) to a serving base station under direction of the serving base station when the long term PMI feedback transmission is required, generates a new codebook using the long term PMI, and determines a short term PMI from the new codebook. A feedback transmitter feeds back the short-term PMI to the serving base station.

22 Claims, 7 Drawing Sheets

APPARATUS AND METHOD FOR OVERHEAD REDUCTION OF FEEDBACK IN CLOSED LOOP MIMO SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Aug. 6, 2009 and assigned Serial No. 10-2009-0072503, the entire disclosure of which is hereby incorporated by reference.

TECHNICAL FIELD OF THE INVENTION

The present invention relates to an apparatus and a method for reducing overhead of feedback in a closed loop Multiple Input Multiple Output (MIMO) system of correlated channel environment.

BACKGROUND OF THE INVENTION

Closed loop Multiple Input Multiple Output (MIMO) systems are efficient to enhance the performance in a fading environment, and can offer higher data rates than single-antenna systems.

In a general closed loop MIMO system, a receiver estimates channel state information and feeds back the estimated channel state information to a transmitter over a feedback link. It is advantageous to use the perfect channel state information in the closed loop MIMO system. However, the capacity of the feedback link is very limited.

In the general closed loop MIMO system, a precoding scheme is used when the feedback link from the receiver to the transmitter is present. In particular, the performance of the quantized precoding scheme is determined by design and complexity of a codebook.

The codebook design has been researched for Institute of Electrical and Electronics Engineers (IEEE) 802.16m system and Long Term Evolution (LTE) system. Codebooks of various optimization schemes and types have been suggested, whereas a codebook to adopt is not yet determined and a codebook design for better performance is under examination.

In this respect, what is needed is a codebook with good performance and a feedback method using the same.

SUMMARY OF THE INVENTION

To address the above-discussed deficiencies of the prior art, it is a primary aspect of the present invention to provide an apparatus and a method for reducing feedback overhead in a closed loop Multiple Input Multiple Output (MIMO) system.

Another aspect of the present invention is to provide an apparatus and a method for reducing feedback overhead in a closed loop MIMO system of a correlated channel.

Yet another aspect of the present invention is to provide an apparatus and a method for transmitting and receiving feedback information reduced in size to diminish feedback overhead in a closed loop MIMO system of a correlated channel.

According to one aspect of the present invention, a feedback method of a terminal in a MIMO wireless communication system includes, when a long term Precoder Matrix Index (PMI) feedback transmission is required, feeding back the long term PMI to a serving base station under direction of the serving base station. A new codebook is generated using the long term PMI, and a short term PMI is determined from the new codebook. The short term PMI is fed back to the serving base station.

According to another aspect of the present invention, an operating method of a base station in a MIMO wireless communication system includes sending a reference signal to a terminal and receiving a long term PMI from the terminal. A new codebook is generated using the long term PMI, and a short term PMI from the new codebook is received from the terminal.

According to yet another aspect of the present invention, an apparatus of a terminal for feedback in a MIMO wireless communication system includes a controller for, when long term PMI feedback transmission is required, feeding back the long term PMI to a serving base station under direction of the serving base station, generating a new codebook using the long term PMI, and determining a short term PMI from the new codebook. A feedback transmitter feeds back the short term PMI to the serving base station.

According to still another aspect of the present invention, an apparatus of a base station in a MIMO wireless communication system includes a transmitter for sending a reference signal to a terminal. The apparatus also includes a controller for receiving a long term PMI from the terminal, generating a new codebook using the long term PMI, and receiving a short term PMI from the new codebook from the terminal.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system.

Exemplary embodiments of the present invention provide an apparatus and a method for reducing feedback overhead in a closed loop Multiple Input Multiple Output (MIMO) system.

An achievable performance gain of the closed loop MIMO system increases when a transmitter and a receiver are aware of channel state information. The Channel State Information (CSI) in the closed loop MIMO system is transmitted from the receiver to the transmitter.

When the transmitter uses the CSI, a transmission strategy for the space (to accommodate multiple antennas) and the time (to accommodate multiple blocks) is required.

The closed loop MIMO system includes a quantized precoding scheme, an antenna selection, and an antenna cycling together or without rank control. Different space-time coding and spatial multiplexing transmission schemes are used.

The present invention provides a new scheme for enhancing the performance of the current codebook in a correlated channel environment. A terminal merely feeds back the strongest eigenvalue (vector) in a transmit correlation matrix, rather than the transmit correlation matrix.

Based on this information, the terminal and a base station constitute a new codebook using the same method. Herein, eigenvectors of the new codebook span uniformly or around the strongest eigenvector.

For each individual channel, the terminal feeds back the best Precoder Matrix Index (PMI) in the new codebook. The base station receives and uses the best PMI in downlink transmission.

Figure 1:
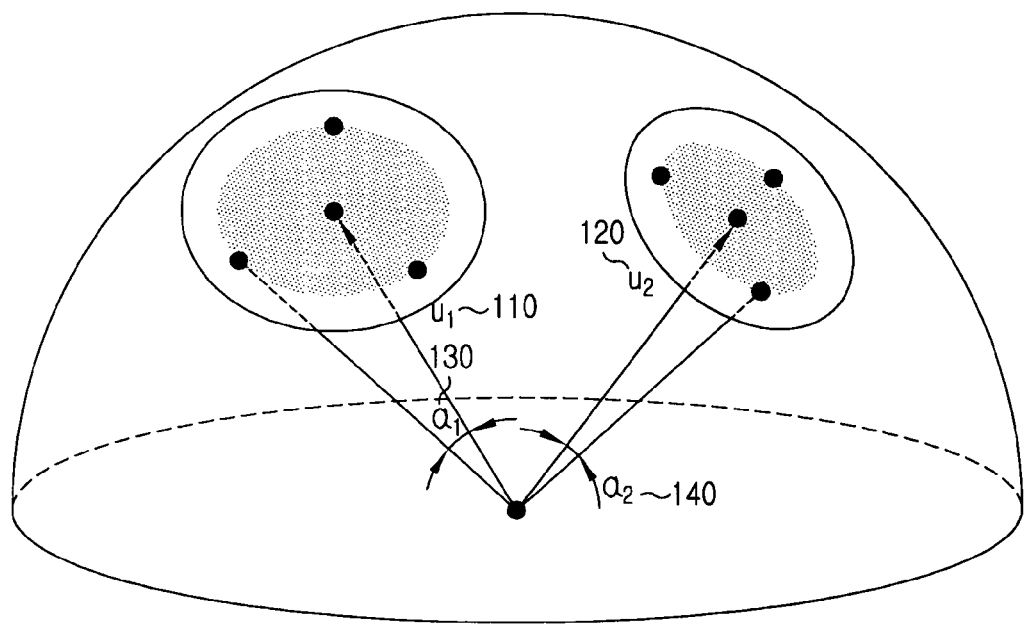
FIG. 1 illustrates an eigenvector distribution according to an embodiment of the present invention.

FIG. 1 illustrates distribution of eigenvectors according to an embodiment of the present invention.

$u_1$ 110 and $u_2$ 120 are two top eigenvectors, and $\alpha_1$ 130 and $\alpha_2$ 140 are angles for the two eigenvectors.

Figure 2:
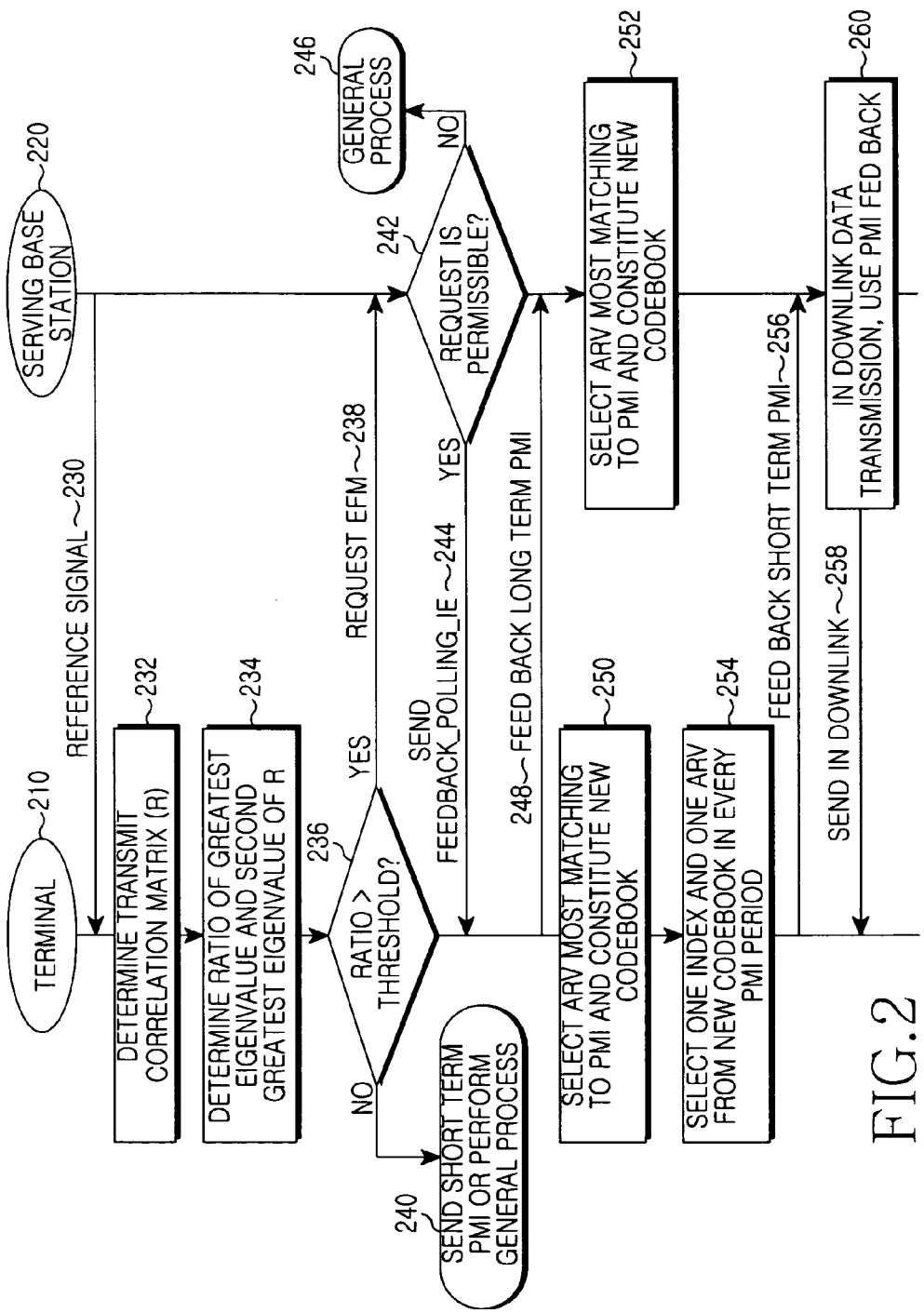
FIG. 2 illustrates a message flow between a terminal and a serving base station according to an embodiment of the present invention.
Figure 3:
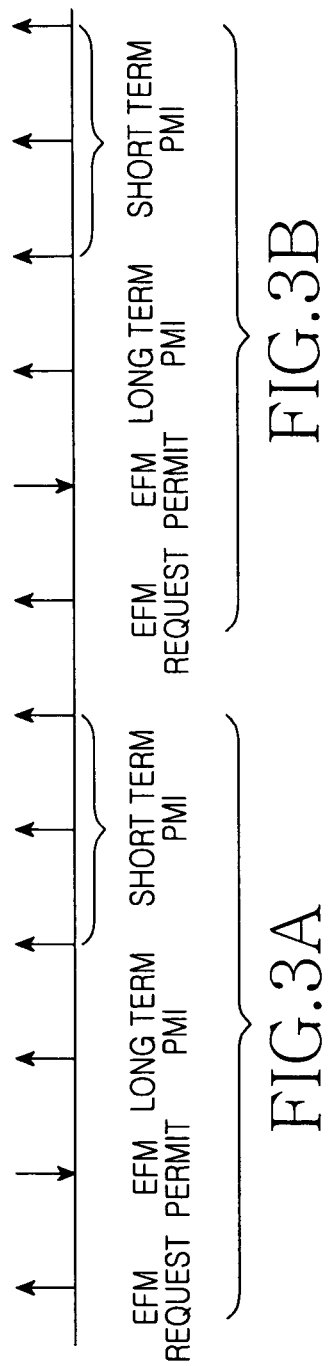
FIGS. 3A and 3B illustrate long term PMI and short term PMI transmissions according to an embodiment of the present invention.

FIG. 2 illustrates a message flow between a terminal and a serving base station according to an embodiment of the present invention.

The terminal 210 receives a reference signal 230 from the serving base station 220, and thus determines a transmit correlation matrix R in block 232.

Next, the terminal 210 determines a ratio of the greatest eigenvalue to the second greatest eigenvalue in the transmit correlation matrix in block 234. When the ratio exceeds a threshold in block 236, the terminal 210 sends an Efficient Feedback Mode (EFM) request 238 to the serving base station 220.

When the ratio falls within the threshold in block 236, the terminal 210 continues a short term PMI transmission, to be explained, or performs a general feedback transmission in block 240. Herein, the threshold can be determined using an empirical or theoretical value.

When an EFM event occurs without the request from the serving base station 220, the terminal 210 can feed back to the serving base station 220 using a Media Access Control (MAC) management message.

When the EFM request is permissible in block 242, the serving base station 220 sends a Feedback_Polling_IE 244 indicating the EFM allowance to the terminal 210. When the EFM request is not acceptable in block 242, the serving base station 220 performs the general feedback process in block 246.

In other words, when not receiving the Feedback_Polling_IE 238, the terminal 210 can perform the short term PMI transmission or the general feedback transmission. When rejecting the request, the serving base station 220 can perform no operation at all. The serving base station 220 can set the EFM request criterion according to the experiment, the standard, or the deploy policy.

Upon receiving the Feedback_Polling_IE 238 from the serving base station 220, the terminal 210 feeds back a long term PMI 248 from a base codebook.

A codebook includes vectors indicating size and direction of antennas and transmit streams according to the number of the antennas and the number of the transmit streams. Indexes can be mapped to combinations of the transmit antennas and the vectors per stream.

The base codebook used here is determined or selected by the system and can employ any kind of codebook.

The long term PMI is determined as below.

The terminal 210 determines the greatest eigenvector $u_1$ in the transmit correlation matrix. For example, the eigenvector corresponding to the greatest eigenvalue is given by the following equation.

$$u_1 = \text{argmax} |R*u| \quad \text{[Eqn. 1]}$$

In Equation 1, $u_1$ is the greatest eigenvector in the transmit correlation vector R. u denotes the eigenvector in the transmit correlation matrix R.

Next, the terminal 210 compares the determined $u_1$ with all of $N_1$-ary PMIs of the rank 1, and determines v* that is the closest PMI to $u_1$. Herein, $N_1 = 2^{B_1}$, where $B_1$ denotes a bit codebook. The PMI v* is given by the following equation. The PMI v* can be a wideband PMI or a subband PMI.

$$v^* = \underset{i=1,\ldots,N_1}{\text{argmax}} |u_1^H v_i| \quad \text{[Eqn. 2]}$$

In Equation 2, v* denotes the closest PMI and H denotes a channel matrix. κ denotes the wideband or subband PMI.

As such, the terminal 210 feeds back the PMI v* (the long term PMI 248) to the serving base station 220. The terminal 210 carries out the feedback transmission within one time window relative to a channel coherence time. Herein, the PMI is referred to as the long term PMI 248.

Since the selected PMI v* may not be one Discrete Fourier Transform (DFT) codebook vector or one Array Response Vector (ARV), it is necessary to match the selected PMI v* to one ARV.

Herein, the selected PMI v* is the main eigenvector. To represent every ARV between '0' degrees and '180' degrees, $B_2$ bits (for example, '4' bits or '6' bits) are used.

Both of the terminal 210 and the serving base station 220 have a $B_2$-bit ARQ set. Both of the terminal 210 and the serving base station 220 select the same ARV based on the fed-back PMI v*. Herein, the $B_2$-bit ARV set is $W=\lfloor w_1, w_2, \ldots, w_{2^{B_2}} \rfloor$. The ARVs are given by the following equation.

$$w_i = \frac{1}{\sqrt{M}} \left[ 1 e^{-j2\pi d\cos(\theta_i)/\lambda} e^{-j2*2\pi d\cos(\theta_i)/\lambda} \ldots e^{-j2*(M-1)\pi d/\lambda \cos(\theta_i)} \right]^T \quad \text{[Eqn. 3]}$$

In Equation 3, $\theta_i = \pi(i-1)/N^2$, M denotes a transmit antenna number, and w denotes the ARV.

The ARV most matching to the fed-back PMI v* can be determined based on the following equation.

$$w^* = \underset{i=1,\ldots,2^N}{\operatorname{argmax}} |w_i^H \times v^*| \quad \text{[Eqn. 4]}$$

In Equation 4, w denotes the ARV, H denotes the channel matrix, and v denotes the wideband or subband PMI.

After the terminal 210 and the serving base station 220 determine the most matching ARV ($w^*=w_k$), a new codebook can be set or constituted in the terminal 210 in block 250 and in the serving base station 220 in block 252.

As for $\theta_k$, in consideration of the $B_3$-bit (for example, '2' or '3' bits) representation for the close ARV that includes the same or different angle separation, the angle spread around the main direction is $\alpha_1$ (for example, '40' degrees). $C(C=\lfloor c_1, c_2, \ldots, c_{2^{B_3}} \rfloor)$ which is a $B_3$-bit codebook is given by the following equation.

$$c_i = \frac{1}{\sqrt{M}} \left[ 1 e^{-j2\pi d\cos(\theta_k - \alpha_1/2 + (i-1)\alpha_1/2^{B_3})/\lambda} \ldots \right.$$
$$\left. e^{-j2*(M-1)\pi d\cos(\theta_k - \alpha_1/2 + (i-1)\alpha_1/2^{B_3})/\lambda} \right]^H \quad \text{[Eqn. 5]}$$

In Equation 5, $c_i$ denotes the new codebook, M denotes the transmit antenna number, and H denotes the channel matrix.

The terminal 210 and the serving base station 220 have the PMIs (the $B_3$-bit codebook) of the main direction (the wideband PMI feedback which is rarely fed back) and around the main direction together.

For each PMI feedback period, the terminal 210 selects one index from the codebook C and one ARV around the main direction in block 254, and feeds back a $B_3$-bit ('2'- or '3'-bit) index indicating this selection to the base station. That is, the terminal 210 feeds back the short term PMI 256 to the serving base station 220.

The serving base station 220 generates the same codebook C, precodes the transmit data using the PMI index fed back in the downlink transmission in block 260, and sends the transmit data 258 to the terminal 210.

FIGS. 3A and 3B illustrate the long term PMI and the short term PMI transmissions according to an embodiment of the present invention.

After the EFM is requested as stated earlier, when the serving base station accepts the EFM, the terminal sends the long term PMI for the EFM and then sends the short term PMI as shown in FIG. 3A. When a new EFM event takes place in the terminal as the channel environment changes, the terminal repeats this process as shown in FIG. 3B.

The EFM event takes places when the ratio of the two greatest eigenvectors of the transmit correlation matrix R determined by the terminal exceeds the threshold (e.g. when the channel environment has changed too much to use the current long term PMI).

Figure 4:
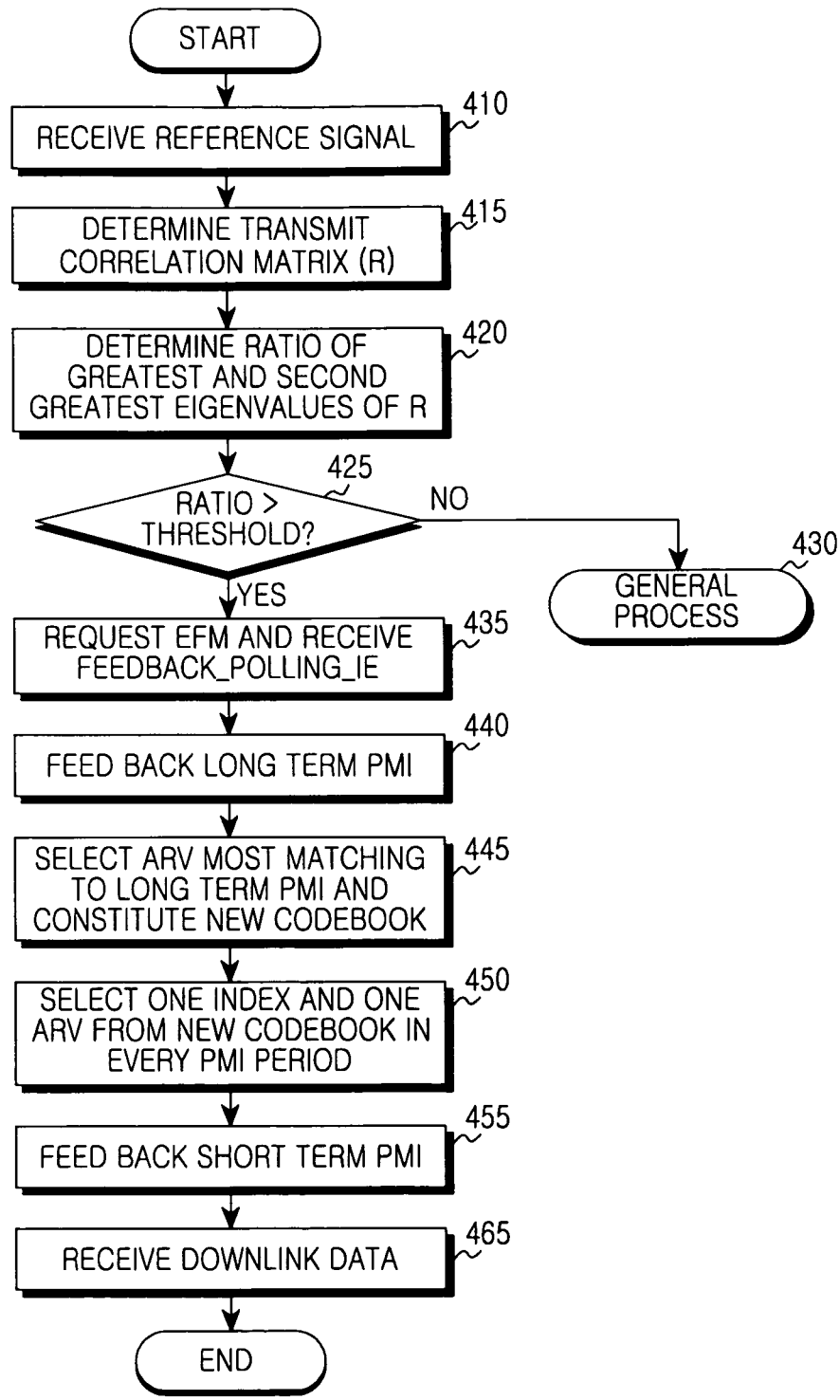
FIG. 4 illustrates a process of reducing feedback overhead in a terminal according to an embodiment of the present invention.

FIG. 4 illustrates a process for reducing feedback overhead in a terminal according to an embodiment of the present invention.

The terminal receives the reference signal from the serving base station in block 410 and determines the transmit correlation matrix in block 415.

In block 420, the terminal determines the ratio of the greatest eigenvalue and the second greatest eigenvalue in the transmit correlation matrix.

When the ratio falls within the threshold in block 425, the terminal continues the short term PMI transmission or performs the general feedback transmission in block 430.

When the ratio exceeds the threshold in block 425, the terminal requests the EFM to the serving base station and receives the Feedback_Polling_IE indicating the EFM request acceptance from the serving base station in block 435.

When not receiving the Feedback_Polling_IE, the terminal can continue the short term PMI transmission or perform the general feedback transmission.

Upon receiving the Feedback_Polling_IE from the serving base station in block 435, the terminal feeds back the long term PMI from the base codebook in block 440. Next, the terminal and the serving base station select the ARV most matching to the long term PMI and generate the new codebook in block 445.

In block 450, the terminal selects one index from the new codebook (the codebook C) with respect to each PMI feedback period and one ARV around the main direction. In block 455, the terminal feeds back the short term PMI indicating those selections to the serving base station.

In block 465, the terminal receives downlink data precoded by the serving base station using the fed-back PMI index.

Figure 5:
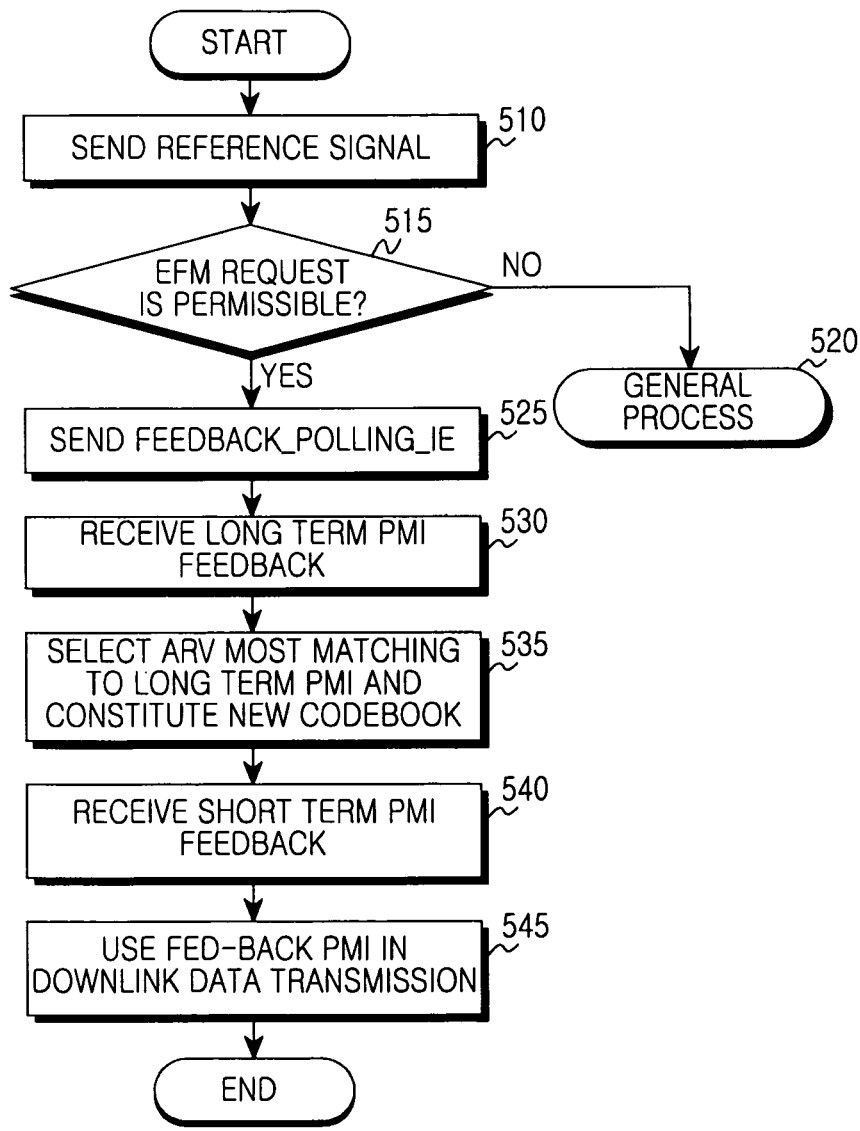
FIG. 5 illustrates a process of reducing feedback overhead in a serving base station according to an embodiment of the present invention.

FIG. 5 illustrates a process for reducing overhead in a serving base station according to an embodiment of the present invention.

In block 510, the serving base station sends the reference signal to the terminal.

Next, the serving base station receives the EFM request from the terminal. When the EFM request is not permissible in block 515, the general feedback process is carried out in block 520. In more detail, since the terminal cannot receive the Feedback_Polling_IE, the short term PMI transmission is continued or the general feedback transmission is conducted.

When the EFM request is permissible in block 515, the serving base station sends the Feedback_Polling_IE indicating the EFM acceptance to the terminal in block 525.

In block 530, the serving base station receives the long term PMI from the base codebook fed back from the terminal.

In block 535, the serving base station selects the ARV most matching to the long term PMI and constitutes the new codebook according to the terminal.

Next, in each PMI feedback period, the serving base station receives the short term PMI indicating the one index selected from the new codebook (the codebook C) and one ARV around the main direction selected by the terminal, from the terminal in block 540.

In block 545, the serving base station precodes data using the PMI index fed back in the downlink transmission and sends the precoded data to the terminal in block 545.

Figure 6:
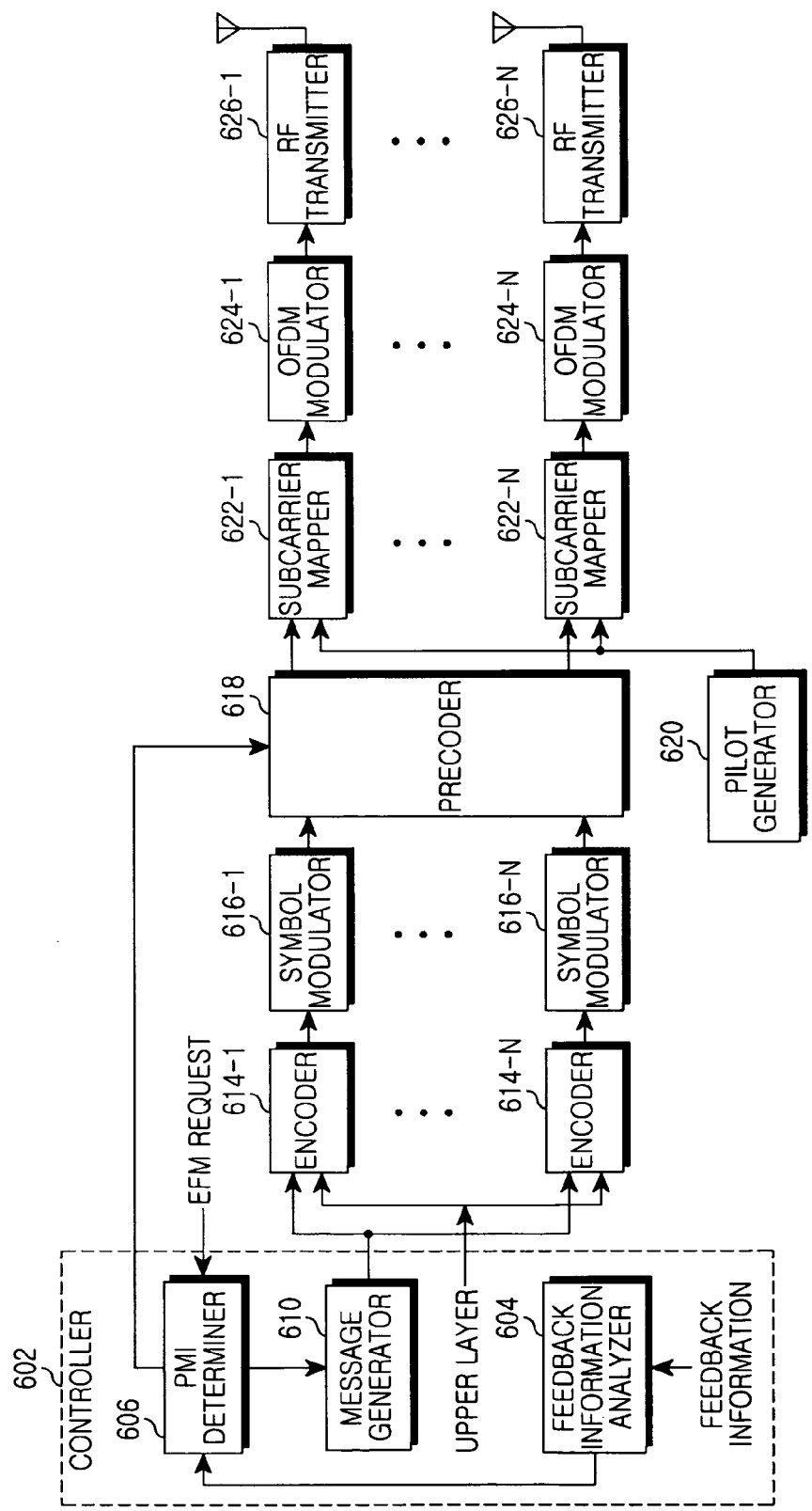
FIG. 6 illustrates a serving base station according to an embodiment of the present invention.

FIG. 6 illustrates a serving base station according to an embodiment of the present invention.

The serving base station of FIG. 6 includes feedback information analyzer 604, a PMI determiner 606, a message generator 610, a plurality of encoders 614-1 through 614-N, a plurality of symbol modulators 616-1 through 616-N, a precoder 618, a pilot generator 620, a plurality of subcarrier mappers 622-1 through 622-N, a plurality of Orthogonal Frequency Division Multiplexing (OFDM) modulators 624-1 through 624-N, and a plurality of Radio Frequency (RF) transmitters 626-1 through 626-N.

The feedback information analyzer 604 confirms the information fed back from the terminal. That is, the feedback information analyzer 604 converts the signal indicating the feedback information to an information bit string according to a predefined feedback scheme. For example, when the feedback scheme based on the codeword is applied, the feedback information analyzer 604 identifies the transmitted codeword by correlating the signal received over the feedback channel and the available codewords, and confirms the feedback information corresponding to the identified codeword. Herein, the feedback information indicates one of the long term PMI and the short term PMI as described above.

Based on the long term PMI transmitted from the terminal, the PMI determiner 606 selects the ARV most matching to the long term PMI and constitutes the new codebook, and determines the PMI to use by use of the short term PMI. The PMI determiner 606 provides the precoder 618 with the precoding vector to use to precode the downlink signal. The PMI determiner 606 receives the EFM request from the terminal.

The PMI determiner 606 determines whether to use the EFM requested by the terminal. When the EFM is allowed, the PMI determiner 606 provides the corresponding information to the message generator 610. The message generator 610 generates the Feedback_Polling_IE based on the corresponding information, and provides the Feedback_Polling_IE to the encoders 614-1 through 614-N.

The encoders 614-1 through 614-N each encode the data bit string provided from the message generator 610 or the upper layer. The symbol modulators 616-1 through 616-N each modulate the encoded bit string to complex symbols.

The precoder 618 precodes to reject inter-cell interference. That is, the precoder 618 precodes the transmit signals using the precoding vector (the PMI) provided from the PMI determiner 606.

The pilot generator 620 generates and provides pilot signals to the subcarrier mappers 622-1 through 622-N. When the pilot signals are scrambled, the pilot generator 620 multiplies the pilot signal string by a scrambling code and provides the pilot signals multiplied by the scrambling code to the subcarrier mappers 622-1 through 622-N.

The subcarrier mappers 622-1 through 622-N each generate frequency-domain signals by mapping the transmit signals and the pilot signals of their corresponding transmission path, among the precoded transmit signals, to subcarriers.

The OFDM modulators 624-1 through 624-N each convert the frequency-domain signals to time-domain signals through Inverse Fast Fourier Transform (IFFT) operation, and generate baseband OFDM symbols by inserting a Cyclic Prefix (CP).

The RF transmitters 626-1 through 626-N each convert the baseband OFDM symbols to an RF signal and then transmit the RF signal via an antenna.

As constructed above, a controller 602 can function as the feedback information analyzer 604, the PMI determiner 606, and the message generator 610. Here, they are separately provided to distinguish their functions.

In the actual product implementation, the controller 602 can process all or part of the functions of the feedback information analyzer 604, the PMI determiner 606, and the message generator 610.

The function blocks excluding the controller 602 can be referred to as a transmitter. Note that the serving base station includes a receiver, not shown, that performs reverse functions of the transmitter.

Figure 7:
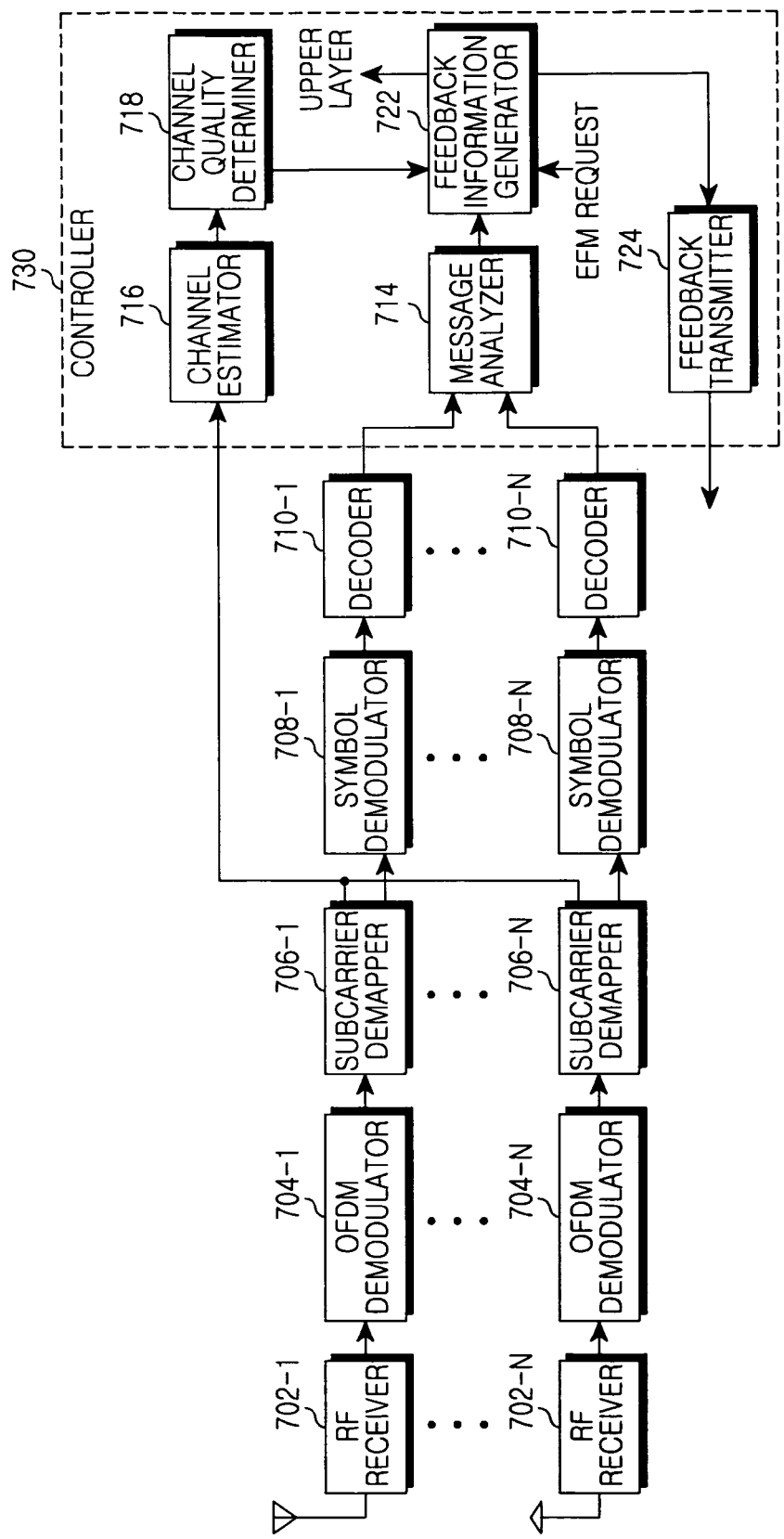
FIG. 7 illustrates a terminal according to an embodiment of the present invention.

FIG. 7 illustrates a terminal according to an embodiment of the present invention.

The terminal of FIG. 7 includes a plurality of RF receivers 702-1 through 702-N, a plurality of OFDM demodulators 704-1 through 704-N, a plurality of subcarrier demappers 706-1 through 706-N, a plurality of symbol demodulators 708-1 through 708-N, a plurality of decoders 710-1 through 710-N, a message analyzer 714, a channel estimator 716, a channel quality determiner 718, a feedback information generator 722, and a feedback transmitter 724.

The RF receivers 702-1 through 702-N convert the RF signal received via an antenna to a baseband signal. The OFDM demodulators 704-1 through 704-N divide the baseband signal based on the OFDM symbol, remove the CP, and restore the complex symbols mapped to the frequency domain through FFT operation.

The symbol demodulators 708-1 through 708-N demodulate the complex symbols to the encoded bit string. The decoders 710-1 through 710-N decode the encoded bit string.

The message analyzer 714 analyzes a control message received from the serving base station and thus obtains information contained in the control message. In particular, when receiving the Feedback_Polling_IE from the base station, the message analyzer 714 informs the feedback information generator 722 of the reception of the Feedback_Polling_IE.

The channel estimator 716 estimates the channel matrices of the serving base station and the neighboring base stations using the pilot signals provided from the subcarrier demappers 706-1 through 706-N.

In more detail, the channel estimator 716 estimates the downlink channel to the serving base station using the reference signal or the pilot signal from the serving base station, and estimates the downlink channel matrix to the neighboring base stations using the reference signals or the pilot signals from the neighboring base stations.

The channel quality determiner 718 determines the channel quality. Herein, the channel quality indicates a channel quality when the precoding vector is applied. According to an embodiment of the present invention, the channel quality determiner 718 determines the transmit correlation matrix in the received reference signal, determines the ratio of the two greatest eigenvalues in the transmit correlation matrix, and provides the determined ratio to the feedback information generator 722.

The feedback information generator 722 generates the information to feed back to the serving base station. When the serving base station allows the terminal to use the EFM; that is, when the reception of the Feedback_Polling_IE is notified from the message generator 714, the feedback information generator 722 generates the long term PMI and the short term PMI.

The feedback information generator 722 receives the EFM permission from the message analyzer 714. When the ratio of the two greatest eigenvalues provided from the channel quality determiner 718 exceeds the threshold, the feedback information generator 722 requests the EFM use to the serving base station. The feedback information generator 722 selects the ARV most matching to the long term PMI and constitutes the new codebook based on the long term PMI, and determines the PMI to use by use of the short term PMI.

The feedback transmitter 724 sends the feedback information generated by the feedback information generator 722 to the serving base station. More specifically, the feedback transmitter 724 converts the feedback information to a physical signal and transmits the signal over the antenna. For example, when the codeword-based feedback scheme is applied, the feedback transmitter 724 confirms the codeword corresponding to the feedback information, converts the confirmed codeword to a physical signal, and then transmits the physical signal over the feedback channel.

As constructed above, a controller 730 can function as the message analyzer 714, the channel estimator 716, the channel quality determiner 718, the feedback information generator 722, and the feedback transmitter 724. Here, they are separately illustrated to distinguish their functions.

In the actual product, the controller 730 can process all or part of the functions of the message analyzer 714, the channel estimator 716, the channel quality determiner 718, the feedback information generator 722, and the feedback transmitter 724.

The function blocks excluding the controller 730 can be referred to as a receiver. Note that the terminal includes a transmitter, which is not shown, performing reverse functions of the receiver.

As set forth above, in the closed loop MIMO system of the correlated channel, the performance can be enhanced by reducing the size of the feedback information in the feed back and mitigating the feedback overhead.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A feedback method of a terminal in a Multiple Input Multiple Output (MIMO) wireless communication system, the feedback method comprising:
    feeding back, by a feedback transmitter, a long term Precoder Matrix Index (PMI) to a serving base station under direction of the serving base station when the long term PMI feedback transmission is required;
    generating, by a controller, a new codebook using the long term PMI;
    determining, by the controller, a short term PMI from the new codebook; and
    feeding back, by the feedback transmitter, the short term PMI to the serving base station,
    wherein the long term PMI feedback transmission is required when a transmit correlation matrix is determined from a reference signal received from the serving base station and a ratio of two greatest eigenvalues in the transmit correlation matrix exceeds a threshold.

2. The feedback method of claim 1, wherein feeding back the long term PMI to the serving base station under the direction of the serving base station comprises:
    requesting an Efficient Feedback Mode (EFM) use to the serving base station; and
    feeding back the long term PMI to the serving base station when receiving a response message that indicates allowance of the EFM use.

3. The feedback method of claim 1, wherein generating the new codebook using the long term PMI and determining of the short term PMI from the new codebook comprise:
    constituting the new codebook by selecting an Array Response Vector (ARV) most matching to the long term PMI in an ARV set; and
    determining a PMI to transmit in the new codebook.

4. The feedback method of claim 3, wherein the ARV set is $W=\lfloor w_1, w_2, \ldots, w_{2^{B_2}} \rfloor$, where $B_2$ denotes one of four bits and six bits, and ARV elements of the ARV set are given by the following equation:

$$w_i = \frac{1}{\sqrt{M}}[1 e^{-j2\pi d \cos(\theta_i)/\lambda} e^{-j2*2\pi d \cos(\theta_i)/\lambda} \ldots e^{-j2*(M-1)\pi d/\lambda \cos(\theta_i)}]^T$$

where $\theta_i = \pi(i-1)/N^2$, M denotes a transmit antenna number, and w denotes the ARV.

5. The feedback method of claim 3, wherein the ARV most matching to the long term PMI is given by the following equation:

$$w^* = \operatorname*{argmax}_{i=1,\ldots,2^N} |w_i^H \times v^*|$$

where $w^*$ denotes the ARV most matching to the long term PMI, H denotes a channel matrix, and v denotes a wideband or subband PMI.

6. The feedback method of claim 3, wherein the new codebook is $C(C=\lfloor c_1, c_2, \ldots, c_{2^{B_3}} \rfloor)$, where $B_3$ denotes one of two bits and three bits, and elements of the new codebook are given by the following equation:

$$c_i = \frac{1}{\sqrt{M}}\Big[1 e^{-j2\pi d \cos(\theta_k - \alpha_1/2 + (i-1)\alpha_1/2^{B_3})/\lambda} \ldots$$
$$e^{-j2*(M-1)\pi d \cos(\theta_k - \alpha_1/2 + (i-1)\alpha_1/2^{B_3})/\lambda}\Big]^H$$

where $c_i$ denotes the new codebook, M denotes a transmit antenna number, and H denotes a channel matrix.

7. An operating method of a base station in a Multiple Input Multiple Output (MIMO) wireless communication system, comprising:
    sending, by a transmitter, a reference signal to a terminal;
    receiving, by a controller, a long term Precoder Matrix Index (PMI) from the terminal;
    generating, by the controller, a new codebook using the long term PMI; and
    receiving, by the controller, from the terminal a short term PMI from the new codebook, wherein receiving the long term PMI from the terminal comprises:
        receiving an Efficient Feedback Mode (EFM) request from the terminal;
        sending a response message to the terminal when the EFM request is permissible; and
        receiving the long term PMI from the terminal, and
    wherein the EFM request takes places when a ratio of two greatest eigenvectors of transmit correlation matrix exceeds a threshold.

8. The operating method of claim 7, wherein generating the new codebook using the long term PMI comprises:
    constituting the new codebook by selecting an Array Response Vector (ARV) most matching to the long term PMI in an ARV set.

9. The operating method of claim 8, wherein the ARV set is $W=\lfloor w_1, w_2, \ldots, w_{2^{B_2}} \rfloor$, where $B_2$ denotes one of four bits and six bits, and ARV elements of the ARV set are given by the following equation:

$$w_i = \frac{1}{\sqrt{M}}[1 e^{-j2\pi d \cos(\theta_i)/\lambda} e^{-j2*2\pi d \cos(\theta_i)/\lambda} \ldots e^{-j2*(M-1)\pi d/\lambda \cos(\theta_i)}]^T$$

where $\theta_i = \pi(i-1)/N^2$, M denotes a transmit antenna number, and w denotes the ARV.

10. The operating method of claim 8, wherein the ARV most matching to the long term PMI is given by the following equation:

$$w^* = \underset{i=1,\ldots,2^N}{\operatorname{argmax}} |w_i^H \times v^*|$$

where w* denotes the ARV most matching to the long term PMI, H denotes a channel matrix, and v denotes a wideband or subband PMI.

11. The operating method of claim 8, wherein the new codebook is $C(C=\lfloor c_1, c_2, \ldots, c_{2^{B_3}} \rfloor)$, where $B_3$ denotes one of two bits and three bits, and elements of the new codebook are given by the following equation:

$$c_i = \frac{1}{\sqrt{M}} \left[ 1 e^{-j2\pi d\cos(\theta_k - \alpha_1/2 + (i-1)\alpha_1/2^{B_3})/\lambda} \ldots \right.$$
$$\left. e^{-j2*(M-1)\pi d\cos(\theta_k - \alpha_1/2 + (i-1)\alpha_1/2^{B_3})/\lambda} \right]^H$$

where $c_i$ denotes the new codebook, M denotes a transmit antenna number, and H denotes a channel matrix.

12. An apparatus of a terminal for feedback in a Multiple Input Multiple Output (MIMO) wireless communication system, comprising:
a feedback transmitter configured to feed back a long term Precoder Matrix Index (PMI) to a serving base station under direction of the serving base station when long term PMI feedback transmission is required;
a controller configured to generate a new codebook using the long term PMI, and determine a short term PMI from the new codebook; and
an antenna configured to receive a reference signal from the serving base station;
the feedback transmitter further configured to feed back the short term PMI to the serving base station,
wherein the controller is further configured to determine a transmit correlation matrix from the reference signal received from the serving base station, and determine that the long term PMI feedback transmission is required when a ratio of two greatest eigenvalues in the transmit correlation matrix exceeds a threshold.

13. The apparatus of claim 12, wherein the controller, when feeding back the long term PMI to the serving base station under the direction of the serving base station, is further configured to request an Efficient Feedback Mode (EFM) use to the serving base station, and feed back the long term PMI to the serving base station when receiving a response message that indicates allowance of the EFM use.

14. The apparatus of claim 12, wherein the controller, when generating the new codebook using the long term PMI and determining the short term PMI from the new codebook, is further configured to select an ARV most matching to the long term PMI in the ARV set, constitute the new codebook, and determine a PMI to send in the new codebook.

15. The apparatus of claim 14, wherein the ARV set is $W=\lfloor w_1, w_2, \ldots, w_{2^{B_2}} \rfloor$, where $B_2$ denotes one of four bits and six bits, and ARV elements of the ARV set are given by the following equation:

$$w_i = \frac{1}{\sqrt{M}} \left[ 1 e^{-j2\pi d\cos(\theta_i)/\lambda} e^{-j2*2\pi d\cos(\theta_i)/\lambda} \ldots e^{-j2*(M-1)\pi d/\lambda \cos(\theta_i)} \right]^T$$

where $\theta_i = \pi(i-1)/N^2$, M denotes a transmit antenna number, and w denotes the ARV.

16. The apparatus of claim 14, wherein the ARV most matching to the long term PMI is given by the following equation:

$$w^* = \underset{i=1,\ldots,2^N}{\operatorname{argmax}} |w_i^H \times v^*|$$

where w* denotes the ARV most matching to the long term PMI, H denotes a channel matrix, and v denotes a wideband or subband PMI.

17. The apparatus of claim 14, wherein the new codebook is $C(C=\lfloor c_1, c_2, \ldots, c_{2^{B_3}} \rfloor)$, where $B_3$ denotes one of two bits and three bits, and elements of the new codebook are given by the following equation:

$$c_i = \frac{1}{\sqrt{M}} \left[ 1 e^{-j2\pi d\cos(\theta_k - \alpha_1/2 + (i-1)\alpha_1/2^{B_3})/\lambda} \ldots \right.$$
$$\left. e^{-j2*(M-1)\pi d\cos(\theta_k - \alpha_1/2 + (i-1)\alpha_1/2^{B_3})/\lambda} \right]^H$$

where $c_i$ denotes the new codebook, M denotes a transmit antenna number, and H denotes a channel matrix.

18. An apparatus of a base station in a Multiple Input Multiple Output (MIMO) wireless communication system, comprising:
a transmitter configured to send a reference signal to a terminal via an antenna; and
a controller configured to receive a long term Precoder Matrix Index (PMI) from the terminal, generate a new codebook using the long term PMI, and receive from the terminal a short term PMI from the new codebook,
wherein the controller, when receiving the long term PMI from the terminal, is configured to receive an Efficient Feedback Mode (EFM) request from the terminal, and send a response message to the terminal when the EFM request is permissible, and
wherein the EFM request takes places when a ratio of two greatest eigenvectors of transmit correlation matrix exceeds a threshold.

19. The apparatus of claim 18, wherein the controller, when generating the new codebook using the long term PMI, is further configured to select an Array Response Vector (ARV) most matching to the long term PMI in an ARV set, and constitute the new codebook.

20. The apparatus of claim 19, wherein the ARV set is $W=\lfloor w_1, w_2, \ldots, w_{2^{B_2}} \rfloor$, where $B_2$ denotes one of four bits and six bits, and ARV elements of the ARV set are given by the following equation:

$$w_i = \frac{1}{\sqrt{M}} \left[ 1 e^{-j2\pi d\cos(\theta_i)/\lambda} e^{-j2*2\pi d\cos(\theta_i)/\lambda} \ldots e^{-j2*(M-1)\pi d/\lambda \cos(\theta_i)} \right]^T$$

where $\theta_i = \pi(i-1)/N^2$, M denotes a transmit antenna number, and w denotes the ARV.

21. The apparatus of claim 19, wherein the ARV most matching to the long term PMI is given by the following equation:

$$w^* = \underset{i=1,\ldots,2^N}{\operatorname{argmax}} |w_i^H \times v^*|$$

where w* denotes the ARV most matching to the long term PMI, H denotes a channel matrix, and v denotes a wideband or subband PMI.

22. The apparatus of claim 19, wherein the new codebook is $C(C=\lfloor c_1, c_2, \ldots, c_{2^{B_3}} \rfloor)$, where $B_3$ denotes one of two bits and three bits, and elements of the new codebook are given by the following equation:

$$c_i = \frac{1}{\sqrt{M}} \left[ 1 e^{-j2\pi d\cos(\theta_k - \alpha_1/2 + (i-1)\alpha_1/2^{B_3})/\lambda} \ldots e^{-j2*(M-1)\pi d\cos(\theta_k - \alpha_1/2 + (i-1)\alpha_1/2^{B_3})/\lambda} \right]^H$$

where $c_i$ denotes the new codebook, M denotes a transmit antenna number, and H denotes a channel matrix.

* * * * *